United States Patent
Kubitza (10) Patent No.: US 7,588,335 B2
(45) Date of Patent: Sep. 15, 2009

(54) MEASURING BRACE AND ARRANGEMENT AND METHOD FOR DETERMINING THE FORWARD ANGLE OF INCLINATION OF A SPECTACLE FRAME

(75) Inventor: Matthias Kubitza, Aalen (DE)

(73) Assignee: Carl Zeiss Vision GmbH, Aalen (DE)

( * ) Notice: Subject to any disclaimer, the term of this patent is extended or adjusted under 35 U.S.C. 154(b) by 159 days.

(21) Appl. No.: 11/724,189

(22) Filed: Mar. 15, 2007

(65) Prior Publication Data
US 2007/0195266 A1 Aug. 23, 2007

Related U.S. Application Data

(63) Continuation of application No. PCT/EP2005/009949, filed on Sep. 15, 2005.

(30) Foreign Application Priority Data
Sep. 15, 2004 (DE) .................. 10 2004 045 012

(51) Int. Cl.
*A61B 3/10* (2006.01)
*A61B 3/00* (2006.01)
(52) U.S. Cl. ...................... 351/204; 351/200
(58) Field of Classification Search ................. 351/200, 351/204–206, 208
See application file for complete search history.

(56) References Cited

U.S. PATENT DOCUMENTS

| | | | |
|---|---|---|---|
| 4,177,571 A | 12/1979 | Renier | |
| 6,132,045 A | 10/2000 | Gauvreau | |
| 6,257,721 B1 | 7/2001 | Hayashi et al. | |
| 6,659,609 B2 | 12/2003 | Mothes | |
| 7,118,219 B2 * | 10/2006 | Itagaki | 351/216 |
| 2002/0171806 A1 | 11/2002 | Baumgarten | |

FOREIGN PATENT DOCUMENTS

| | | |
|---|---|---|
| DE | 100 20 005 | 11/2001 |
| DE | 100 20 391 | 11/2001 |
| DE | 100 63 536 | 7/2002 |
| DE | 203 02 798 U | 7/2003 |
| FR | 2 829 842 | 3/2003 |

* cited by examiner

*Primary Examiner*—Scott J Sugarman
*Assistant Examiner*—Dawayne A Pinkney
(74) *Attorney, Agent, or Firm*—Walter Ottesen

(57) ABSTRACT

A measuring brace is removably fastened to a spectacle frame. The measuring brace has a traverse and two legs. A front face of the measuring brace is provided with at least three front target marks for measuring the forward angle ($\alpha$) of a spectacle frame to be measured. At least one of the front target marks is disposed spatially offset relative to the at least two other front target marks, essentially perpendicular to the front face of the measuring brace. The measuring brace has coupled clamping elements provided for fastening the spectacle frame (32). In addition, a measuring brace is suggested which is removably fixed to a spectacle frame and in which at least three lateral target marks (27, 27', 28, 28', 29, 29') are provided for measuring an angle of twist ($\epsilon$). The invention also relates to an arrangement and a method for determining the forward tilt angle ($\alpha$) and the angle of twist ($\epsilon$) of a spectacle frame.

40 Claims, 6 Drawing Sheets

MEASURING BRACE AND ARRANGEMENT AND METHOD FOR DETERMINING THE FORWARD ANGLE OF INCLINATION OF A SPECTACLE FRAME

CROSS REFERENCE TO RELATED APPLICATIONS

This application is a continuation application of international patent application PCT/EP 2005/009949, filed Sep. 15, 2005, and claiming priority from German application 10 2004 045 012.9, filed Sep. 15, 2004, and the entire content of both applications is incorporated herein by reference.

FIELD OF THE INVENTION

The invention relates to a measuring brace for the releasable attachment to a spectacle frame. In addition, the invention is directed to a measuring brace for the releasable attachment to a spectacle frame with a traverse and two legs. The forward side of the measuring brace has at least three front target marks for a measurement of the forward inclination angle ($\alpha$) of a spectacle frame to be measured and at least one of the front target marks is arranged essentially spatially offset perpendicular to the forward side of the measuring brace relative to the at least two other front target marks. The invention further relates to an arrangement for determining the forward angle of inclination ($\alpha$) of a spectacle frame as well as to a method for determining the forward inclination angle ($\alpha$) of a spectacle frame as well as the twist angle ($\epsilon$).

BACKGROUND OF THE INVENTION

In the optical centering of spectacle lenses, a measuring brace is used for determining the centering data of an already anatomically adapted spectacle frame under use conditions. The centering data can be utilized for a measurement standard or reference as well as for detection of the frame forward inclination and head twist in video centering systems.

Video centering systems are known in the marketplace, such as the "System Video Infral" of the Carl Zeiss AG as well as a video centering system described in U.S. Pat. No. 6,659,609 which is incorporated herein by reference.

Conventionally, the optical spectacle glass centering takes place in that one views the test customer or test person with a video arrangement from a greater distance, for example, from a distance of 5 m and determines the relevant angles and dimensions in the video images and, from the relevant angles and dimensions, determines the centering data for the particular spectacle frame.

Measuring braces are known from the following publications: U.S. Pat. Nos. 6,659,609; 6,132,045; United States patent application publication 2002/0171806; German utility model registration 203 02 798 and German patent publications 100 20 005; 100 20 391; and 100 63 536. In addition, a measuring brace "Visu Point" of Ulev GmbH is known. The latter is seated loosely on the spectacle frame. The disadvantage here is that the measuring brace can fall from the spectacle frame with a slight movement of the test person. Furthermore, two rods are in the field of view of the test person which, in turn, is disturbing and can lead to measuring errors.

SUMMARY OF THE INVENTION

It is an object of the invention to provide an alternative measuring brace for video centering systems which makes possible, in a simple and space-saving manner, the determination of the forward inclination of the spectacle frame for the habitual posture of the test person.

The measuring brace of the invention is for releasably attaching to a spectacle frame to be measured. The measuring brace has a forward side and includes: a traverse; two legs connected to the traverse; at least three front target marks disposed on the forward side for measuring a forward inclination angle ($\alpha$) of the spectacle frame; at least one of the front target marks being spatially offset essentially perpendicular to the front side with respect to the remainder of the front target marks; and, coupled clamping elements for fixing the spectacle frame.

With this embodiment of the invention, clamp elements are coupled to the measuring brace of the invention for attaching the spectacle frame. In this way, a one-handed manipulation is possible.

In addition to the measurement of the forward inclination angle, it is also an object of the invention to make possible the measurement of a twist angle ($\epsilon$) for the habitual posture of the test person. By considering this twist angle ($\epsilon$), the corneal vertex distance or the distance of the corneal vertex to the plane of the frame can be determined at least almost free of error.

The measuring brace of the invention is for releasably attaching to a spectacle frame to be measured. The measuring brace has a forward side and includes: a traverse; two legs connected to the traverse; at least three front target marks disposed on the forward side for measuring a forward inclination angle ($\alpha$) of the spectacle frame; at least one of the front target marks being spatially offset essentially perpendicular to the front side with respect to the remainder of the front target marks; and, at least three lateral target marks for measuring a twist angle ($\epsilon$).

With this embodiment of the invention, three lateral target marks for measuring a twist angle ($\epsilon$) are provided. In this way, a rotational shift of the measuring brace and therefore also of the spectacle frame, which is held on the measuring brace, is determined.

The measuring brace of the invention is for releasably attaching to a spectacle frame and includes at least three lateral target marks for measuring a twist angle ($\epsilon$).

The above embodiment of the invention solves the task of measuring an angle of twist ($\epsilon$) for the habitual posture of a test person. At least three lateral target marks (27, 27', 28, 28', 29, 29') are provided for measuring the angle of twist ($\epsilon$).

The corneal vertex distance or the distance of the corneal vertex to the plane of the frame is determined with the aid of the lateral image recording which shows the lateral target marks.

In a preferred embodiment, one of the lateral target marks is arranged spatially offset essentially perpendicularly to the lateral region of the measuring brace relative to the at least two additional lateral target marks. This lateral target mark can be arranged on a lateral projection, which is raised in the direction of the recording unit, or in a recess. In this way, this lateral target mark is arranged to be recessed or raised with respect to at least two additional lateral target marks in the direction of a recording unit 39 provided for a lateral recording.

The objects of the invention are realized with an arrangement of the invention for determining the forward inclination angle ($\alpha$) of a spectacle frame.

The arrangement of the invention is for determining the forward inclination angle ($\alpha$) of a spectacle frame and includes: a measuring brace for releasably attaching to a spectacle frame to be measured, the measuring brace having a forward side and including: a traverse; two legs connected to the traverse; at least three front target marks disposed on the forward side for measuring a forward inclination angle (α) of the spectacle frame; at least one of the front target marks being spatially offset essentially perpendicular to the front side with respect to the remainder of the front target marks; at least three lateral target marks for measuring a twist angle (ε); and, the arrangement further including: at least one optical recording unit facing toward the measuring brace; and, an evaluation unit connected to the optical recording unit.

This arrangement has at least one optical recording unit, an evaluation unit and a centering brace according to the invention.

The objects of the invention are also realized with the method of the invention for determining the forward inclination angle (α) of a spectacle frame.

The method of the invention is for determining the forward inclination angle (α) of a spectacle frame worn by a test person and includes the steps of: providing a measuring brace for releasably attaching to a spectacle frame to be measured, the measuring brace having a forward side and including: a traverse; two legs connected to the traverse; at least three front target marks disposed on the forward side for measuring a forward inclination angle (α) of the spectacle frame; at least one of the front target marks being spatially offset essentially perpendicular to the front side with respect to the remainder of the front target marks; and, at least three lateral target marks for measuring a twist angle (ε); placing the measuring brace on the spectacle frame worn by the test person with the person assuming the posture habitual for the person; making an image recording of at least part of the head of the test person from the front while wearing the spectacle frame and the measuring brace; and, mathematically determining the forward inclination angle (α) based on the image recording.

One of the centering braces of the invention is placed on a spectacle frame of a test person exhibiting preferably habitual posture and an image recording of at least one head part with spectacle frame and centering brace is made and, based upon the image recording, the forward inclination angle (α) is mathematically determined.

Furthermore, the objects of the invention are realized with the method of the invention for determining the twist angle (ε).

The method of the invention is for determining the twist angle (ε) and includes the steps of: providing a measuring brace for releasably attaching to a spectacle frame to be measured, the measuring brace having a forward side and including: a traverse; two legs connected to the traverse; at least three front target marks disposed on the forward side for measuring a forward inclination angle (α) of the spectacle frame; at least one of the front target marks being spatially offset essentially perpendicular to the front side with respect to the remainder of the front target marks; and, at least three lateral target marks for measuring a twist angle (ε); placing the measuring brace on a spectacle frame; making an image recording from the side with the spectacle frame and the measuring brace; and, mathematically determining the twist angle (ε) based on the image recording.

With this embodiment of the invention, a centering brace of the invention is placed on the spectacle frame (2, 32) and an image recording from the side is made of the spectacle frame and centering brace and, based on this image recording, the twist angle (ε) is mathematically determined. In this way, a rotational shift of the measuring brace and therefore also of the spectacle frame held by the measuring brace is determined.

Finally, the objects of the invention are realized with a method of the invention for determining the twist angle (ε).

The method of the invention is for determining the twist angle (ε) and includes the steps of: providing a measuring brace for releasably attaching to a spectacle frame to be measured, the measuring brace having a forward side and including: a traverse; two legs connected to the traverse; at least three front target marks disposed on the forward side for measuring a forward inclination angle (α) of the spectacle frame; at least one of the front target marks being spatially offset essentially perpendicular to the front side with respect to the remainder of the front target marks; and, at least three lateral target marks for measuring a twist angle (ε); placing the measuring brace on a spectacle frame; making an image recording from the side with the spectacle frame and the measuring brace; and, mathematically determining the twist angle (ε) based on the image recording; wherein the measuring brace is placed on a spectacle frame worn by a test person assuming the posture habitual for the person; and, the image recording is made of at least part of the head of the test person.

Here, a centering brace of the invention is seated on a spectacle frame (2, 32) of a test person exhibiting habitual posture. An image recording is made of at least a part of the head from the side with spectacle frame and centering brace and, based on this image recording, the twist angle (ε) is mathematically determined.

With respect to a spectacle frame, it is understood that a frame without lenses seated therein is described. Transparent support plano glasses are provided in rimless or at least partially rimless spectacle frames (for example, Bohrbrillen and Nylorbrillen). These support piano glasses do not affect the measurements.

With the use of the centering brace of the invention, the angles of the spectacle frame to be measured to the vertical and horizontal reference directions can be determined by means of a video centering system or a simple camera. The angles include the vertical as well as the horizontal centering data, that is, the vertical forward angle of inclination of the spectacle frame as well as the horizontal head inclination to the side as well as the head twist to the side are measured in the situation of use with a video centering system.

The test person or customer can be essentially at any desired distance to the optical recording unit when utilizing a high-resolution camera. For example, the test person can be at a distance of up to 2 m away. Preferably, because of the limited space conditions at the office of the optometrist or ophthalmologist, the test person can be at a distance of 0.5 m to 1.5 m from the optical recording unit.

A precise alignment of the test person to the optical axis of the image recording unit is not required because the centering points, which are to be determined for the test person, can be optimally determined via the determination of the different angles and dimensions. Should the image recording unit not be precisely at the elevation of the eyes of the test person, then the image recording unit can be tilted and the tilt angle is included in the computation of the angles and dimensions to be determined.

That point within the plane of plano glasses, which should be coincident with the reference point of the ground spectacle lens, is identified as the centering point P. The coordinates x and y of the centering point are equal to the amount of the distance of the centering point from the nasal perpendicular side or from the lower horizontal side of the box system measured in the plane of the plano glasses. The horizontal decentration (μ) and the vertical decentration (ν) of the centering point are the distances of the centering point from the vertical center line of the box system and the horizontal center line of the box system measured in the plane of the frame.

The following are determined in accordance with the parallax principle: the corneal vertex distance, the distance of the corneal vertex to the plane of the frame, the vertical forward inclination angle, the inclination of the head to the side and the head twist to the side. One of the three target marks lies, in the direction of the optical axis of the recording unit, differently to the other two target marks, that is, closer to the optical recording unit or further away therefrom than the other two target marks. For this reason, depending upon the inclination or twist of the head, a corresponding parallax arises which is a measure for the particular angle.

The measurements of the following can take place simultaneously or sequentially: measurement of the forward inclination angle, head inclination to the side, head twist to the side and the corneal vertex distance. In lieu of a head twist, a twist of body can be substituted.

The measuring brace can be easily mounted on the conventional spectacle frames. Spectacles with or without a rim can be measured. The measuring brace is easy to position. The test person has no cause to change posture because the measuring brace leaves the field of view of the test person at least substantially free.

A front projection which extends spatially to the viewer is utilized and this front projection can, for example, be configured as a hollow cone having a center front target mark, that is, a front target mark. This center front projection is raised relative to the front target marks arranged on the forward side of the measuring brace. The measuring brace can be mounted by the optometrist, ophthalmologist or the test person onto the spectacle frame. The spectacle frame can already be provided with plano glasses or lenses or be without plano glasses or lenses. The measuring brace has a weight of less than 50 gm, preferably less than 20 gm.

Preferred embodiments of the measuring brace make possible a measurement standard or reference so that one can work with different image enlargements or magnifications without difficulty. The measurement standard or reference can, for example, take place utilizing markings which are arranged at specific distances with respect to each other or a rod of defined length.

The invention affords the advantage that the measuring brace can be reliably placed on frames of different form, that is, on small forms or large forms, spectacle frames having a rim or rimless spectacle frames.

The measuring brace of the invention is applied to the spectacle frame utilizing a clamp arrangement.

A further advantage of the measuring brace is the easy manipulation when attaching the measuring brace to the spectacle frame. This is achieved via the coupling, especially the synchronized coupling of two lower measuring brace legs via a toothed wheel and two toothed racks. Synchronization is here understood to mean that both measuring brace legs are moved simultaneously. In this way, both measuring brace legs open simultaneously and preferably symmetrically. The spectacle frame can be comfortably inserted. A one-handed manipulation is thereby made possible.

The measuring brace is automatically pressed onto the spectacle frame by the conical support surfaces. A tight seating is thereby assured.

The measuring brace has contrast-rich target marks which can be clearly recognized in an automatic processing. These marks are preferably arranged in groups of three. The groups have a largest possible distance from each other, for example, more than 10 cm, preferably more than 14 cm.

The distance of the target marks should be known to 0.10 mm in order to limit a measuring error of a 70 mm large pupil distance to 0.05 mm.

Target marks, which are applied to the side of the measuring brace (that is, lateral target marks applied essentially at 90° to the front target marks), make possible a calibration of the lateral image recording to determine the corneal vertex distance. Since the lateral target marks are applied in different planes, a compensation of the errors because of a possible twisting of the head by the test person during the image recording is possible in the lateral image. The corneal vertex distance or the distance of the corneal vertex to the plane of the frame can thereby be measured without difficult alignment of the test person.

The measuring brace of the invention can be so positioned that it neither projects into the field of view of the particular test person nor causes the test person to change posture.

In the measurement, one can proceed as generally known. The test person is located at a known distance or at a distance, which is measured during the measurement, of preferably 0.5 m to 1.5 m and, after assuming a habitual posture, a lateral image recording is made. With this lateral image recording, the corneal vertex distance as well as the head twist to the side (as required) can be measured. The head twist to the side can be applied for correcting the measured corneal vertex distance. The habitual posture is understood to mean the test person's own natural posture while sitting or standing.

The forward inclination angle ($\alpha$), the head inclination to the side ($\zeta$) and the head twist to the side ($\phi$) can all be determined utilizing a front image recording wherein the test person likewise assumes a habitual posture.

The target marks can have a different configuration. Conceivable are, inter alia, black circles or circles subdivided into back-white segments. The target marks can, for example, be of paper or plastic and be stamped onto the measuring brace or can be applied with adhesive.

Locating marks, for example, in the form of black circles, can be applied to the forward side of the measuring brace below the front target marks, for example, on the forward cover caps of the joints. These locator marks facilitate the computation of the rest points of the measuring brace of the invention on a rimless or partially rimless spectacle frame for the case that an automatic spectacle rim detection fails. The upper rest points, that is, the points where the rimless spectacles or spectacle frames come to rest in the upper frame receptacles, are fixedly defined geometrically to the front target marks. The lower rest points, that is, the points where the spectacle frames lie in the lower frame receptacles, are fixedly defined geometrically to the locator marks. That is, these points are easily detectable also for rimless spectacles of different sizes and therefore the form of the spectacles is overall easier to determine.

The measuring brace functions as a measurement standard or reference and therefore makes possible a calibration for each measurement. For this reason, the measuring brace is made of a stable and strong material in order to ensure permanent dimensional accuracy.

In a preferred embodiment of the measuring brace, coupled clamping elements are provided to secure the spectacle frame. When the one leg opens, the opening movement takes place with the other leg simultaneously or shifted in time.

In a further preferred embodiment of the measuring brace, the coupled clamping elements can be synchronized. In this way, the legs of the measuring brace can be opened simultaneously.

In a further preferred embodiment of the measuring brace, the front target marks are preferably arranged on a horizontal line preferably in the region of the traverse.

In a further preferred embodiment of the measuring brace, a center front target mark can be arranged on a raised projection and at least two further front target marks are arranged spaced from each other on the forward side of the traverse of the measuring brace.

In a further preferred embodiment of the measuring brace, the distances between forward target mark and rearward front target marks amount to between 5 mm and 50 mm, preferably between 10 mm and 20 mm.

In a further preferred embodiment of the measuring brace and for the purpose of measurement standard or reference, at least two marks are at a defined distance from each other, preferably 10 cm to 20 cm.

In a further preferred embodiment of the measuring brace, the measuring brace can be configured to be manipulated with one hand.

In a further preferred embodiment of the measuring brace, at least one frame receptacle can have at least one essentially conical receiving surface.

In a further preferred embodiment of the measuring brace, the clamping elements can be coupled via a toothed gear assembly.

It is also conceivable to arrange a spring, for example, in the traversal element. The ends of the spring are connected via tension bands to the legs. When pressing the spring together, the tension bands become tensioned and the legs open for placement of a spectacle frame and when releasing the spring, the legs return again to their output position insofar this is permitted because of the inserted spectacle frame.

In a further preferred embodiment of the measuring brace, the coupled clamping elements include at least one toothed wheel and at least one toothed rod, preferably two toothed rods. The toothed rods or racks can be moved via displacement levers.

A rotating knob on the toothed wheel is also conceivable whereby the toothed racks can be moved.

In a further preferred embodiment of the measuring brace, the coupled clamping elements include at least one tension band and one spring, preferably two tension bands and two springs. Tension bands can act on the toothed racks and connect the latter to the legs. The springs can be configured as return springs for the legs.

The arrangement of the invention can also be configured to determine the angle of the head inclination to the side, the angle of head twist to the side and/or to determine the corneal vertex distance.

In a preferred embodiment of the arrangement of the invention, the optical recording unit is configured as a video camera or a photo camera.

In a preferred embodiment of the arrangement of the invention, the evaluation unit is configured also for determining the angle of the head inclination to the side, the angle of the head twist to the side and the corneal vertex distance.

In a preferred embodiment of the arrangement of the invention, the evaluation unit is configured to determine the centering points of the spectacle frame to be investigated.

In a preferred embodiment of the method of the invention, the angle of the head inclination to the side, the angle of the head twist to the side, the corneal vertex distance and/or the distance of the corneal vertex to the spectacle frame are determined. Here, the twist angle ($\epsilon$) can be considered.

Finally, in a preferred embodiment of the method of the invention, the centering points of the spectacle frame to be investigated are determined.

In some of the figures an x-y-z coordinate system is shown to facilitate describing the arrangement of the target marks. The x-, y- and z-axes are mutually perpendicular.

BRIEF DESCRIPTION OF THE DRAWINGS

The invention will now be described with reference to the drawings wherein:

FIG. 2c is a rear elevation view of the measuring brace of FIG. 2a;

FIG. 2d is a side elevation view of the measuring brace of FIG. 2a;

DESCRIPTION OF THE PREFERRED EMBODIMENTS OF THE INVENTION

Conventionally, the optical centering of the spectacle lenses takes place in that one places a measuring brace on a spectacle frame (without lenses) and views the head of the test person with a video unit from a long distance, for example, a distance of 5 m, and measures the relevant angles in the video images. The test person is, for example, a customer and the spectacle frame is anatomically adapted and this takes place in the office of an optometrist or an ophthalmologist.

In the simplest case, photo images can be made. The test person, for example, a customer, looks in the direction of a camera and a picture recording of the face is made with the spectacle frame and the measuring brace.

Figure 1A:
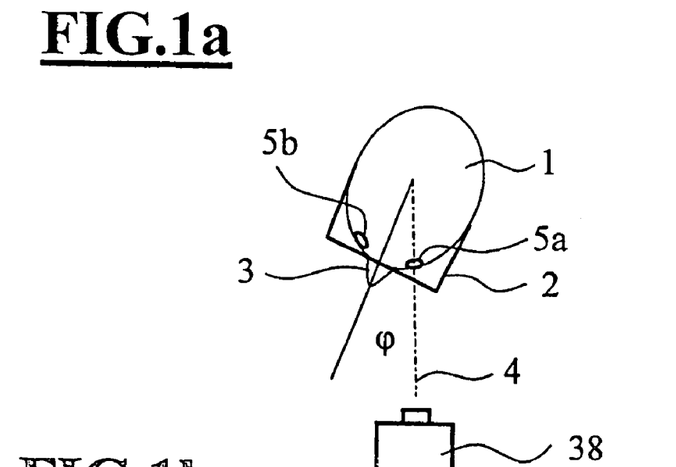
FIG. 1a is a schematic showing the angle ($\phi$) caused by the rotation of the head of a test person to the side during measurement of centering data utilizing a front image.

During the measurement, the test person usually aligns toward a fixation mark of a video centering system. In the ideal case, the test person stands exactly parallel to the optical axis of the optical imaging system, for example, a video camera. Often, the case occurs that the test person aligns the head according to his guiding eye or his seeing habits and thereby assumes a twist angle ($\phi$) to the optical axis of the camera. This head rotation to the side ($\phi$) is shown schematically in FIG. 1a. A test person having head 1 with a spectacle frame 2 on the nose 3 has rotated the head by an angle ($\phi$) from the ideal direction indicated by the broken line, that is, the optical axis 4 of the imaging system (not shown) so that his guiding eye 5a now looks precisely in the direction of the optical axis and the second eye 5b is rotated away. The effects on the centering data of an unwanted rotation can be recognized with the aid of the measuring brace explained hereinafter and can be considered in the evaluation. The angle ($\phi$) is to be determined for this purpose. The recording unit 38 is mounted in the extension of the broken line.

Figure 1B:
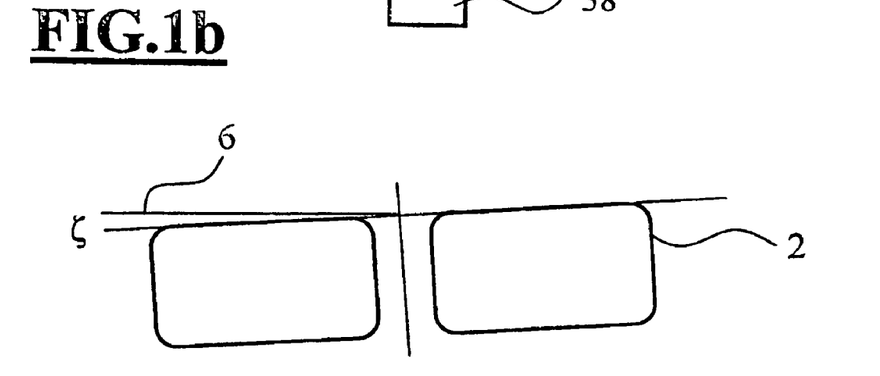
FIG. 1b shows the angle ($\zeta$) caused by the inclination of the head to the side during measurement of centering data.

Often, an inclination of the head to the side by an angle ($\zeta$) can be determined for the habitual head posture of a test person. This is shown in FIG. 1b. The schematically shown spectacle frame 2 is inclined by an angle ($\zeta$) to the left side relative to the horizontal 6. This angle is likewise to be determined for determining the correct centering quantities.

Figure 1C:
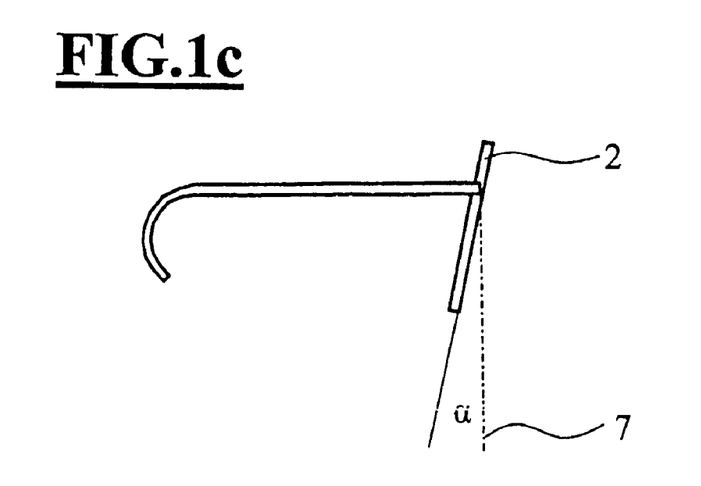
FIG. 1c is a schematic showing the forward inclination angle ($\alpha$) of the spectacle frame.

The forward inclination of the spectacle frame 2 is an important quantity for the vertical centering quantities (elevation centering) and the design of the spectacle lens for the individual spectacle lenses. The inclination angle ($\alpha$) is shown in FIG. 1c and must likewise be measured for determining the centering data. The forward inclination angle ($\alpha$) is dependent upon the anatomy of the customer or test person and the habitual head and body posture of this person as well as on the inclination angle of the spectacle frame 2. The position of the frame plane to the spatial vertical 7 is decisive. The spatial vertical 7 is shown by the dash-dot line.

If the camera of the video centering system is not at the eye level of the test person, then the camera can be tilted. The tilt angle of the camera, which is necessary for the compensation of the body height, must be included in the computation of the forward inclination, that is, of the additional centering values. The forward inclination ($\alpha$) is a measuring variable which is mathematically considered in the determination of the centering points.

The centering quantities can be referred to a boxing system for evaluation in a manner known per se.

FIGS. 2a to 2d show different views of an embodiment of the measuring brace according to the invention.

Figure 4:
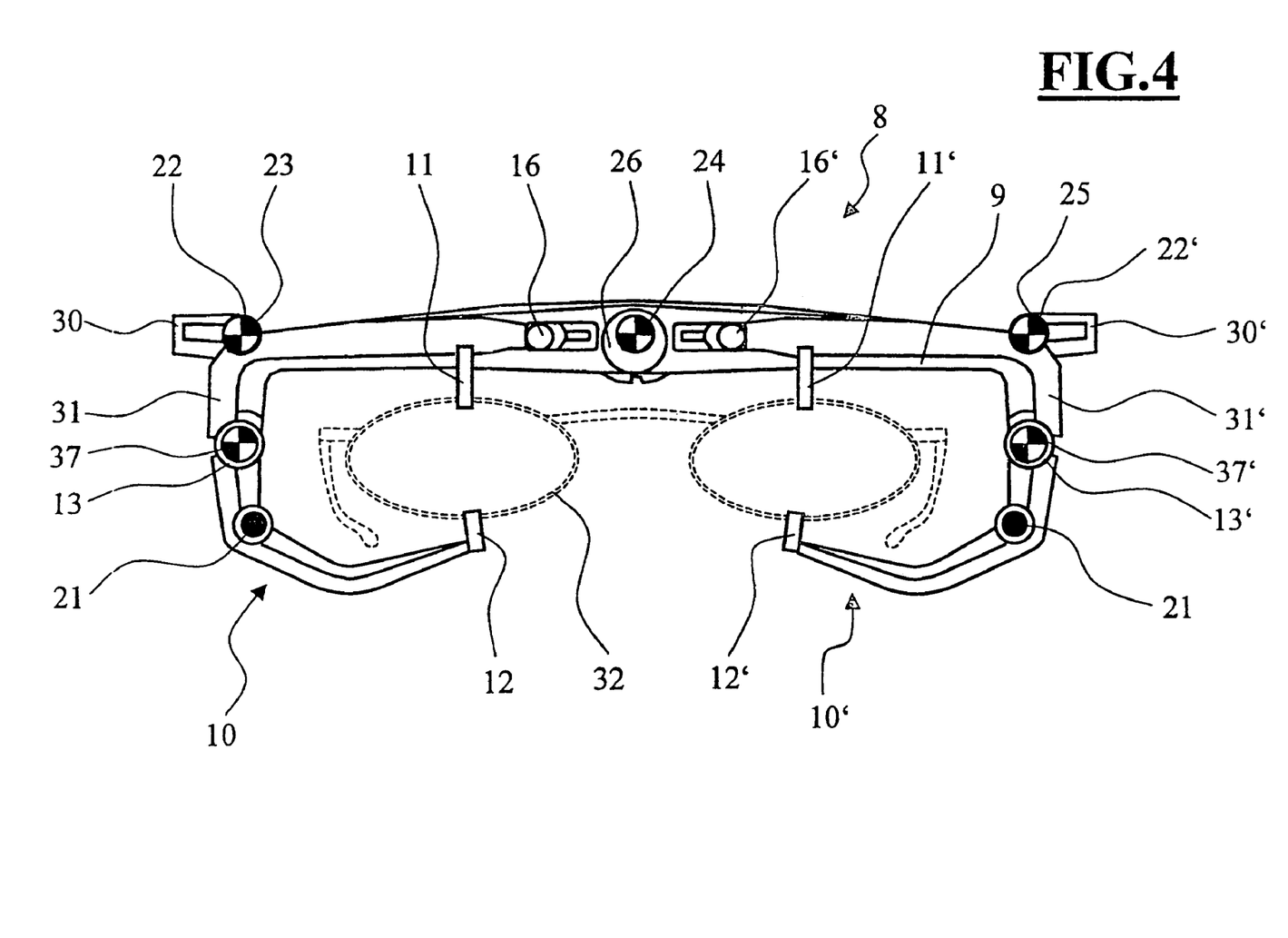
FIG. 4 is a front elevation view of the measuring brace of the invention with the spectacle frame.

The measuring brace 8 includes a symmetrical assembly with a traversal element 9 and two legs (10, 10'). Two upper frame receptacles (11, 11') for the upper spectacle rim of the spectacle frame (not shown) of a test person are arranged on the traversal element 9. A view with the spectacle frame is shown in FIG. 4. Lower frame receptacles (12, 12') are arranged on corresponding ones of the two legs (10, 10'). Two frame receptacles 11 and 12 are shown in detail in FIG. 5.

The legs (10, 10') are rotatably supported about respective joints (13, 13') for accommodating a spectacle frame in the frame receptacles (11, 11'; 12, 12'). The joints (13, 13') are assigned to respective legs (10, 10'). In this way, the distance between the upper frame receptacles (11, 11') and the lower frame receptacles (12, 12') can be increased and the spectacle frame can be placed therein. Pretensioned return springs in the form of helical springs (14, 14') provide for a tight hold, that is, a clamping of the spectacle frame in the measuring brace 8. After removing the spectacle frame from the measuring brace 8, the legs (10, 10') are returned again into a space-saving start position by the return springs (14, 14').

A one-handed manipulation is advantageously provided; that is, both legs are coupled to each other and can be moved preferably at least approximately simultaneously about respective joints (13, 13') by means of clamping elements 17. To carry out the clamping movement, adjusting levers (16, 16') are provided in or on the traversal element 9. The adjusting levers (16, 16') are connected to the legs (10, 10') via a common central toothed wheel 18, two toothed racks (19, 19') and two tension bands (20, 20'). When pressing the adjusting levers (16, 16') together, the toothed racks (19, 19') are displaced over the toothed wheel 18. In this way, both tension bands (20, 20') are pulled and the legs (10, 10') move against the force of the return springs (14, 14') about the joints (13, 13'), respectively. After placing the spectacle frame, one releases the adjusting levers and the legs move back into their start positions to the extent permitted by the inserted spectacle frame and thereby clamp the spectacle frame in place. Other embodiments are also conceivable, for example, in lieu of the adjusting levers (16, 16'), an adjusting switch, adjusting wheel or the like can be provided. Also, the number and type of clamping elements 17 can vary as desired. A spring arranged preferably on the traversal element is, for example, conceivable with this spring being connected to the tension bands. The tension bands are pulled and the legs attached thereto open when pressing this spring together.

If the measuring brace 8 should now be placed on the spectacle frame of a test person, then the optometrist or the test person can hold the measuring brace 8 with one hand as well as actuate the adjusting levers (16, 16') whereupon the legs (10, 10') rotate about joints (13, 13'), respectively, and the measuring brace 8 can be placed upon the spectacle frame. The test person can keep his spectacle frame on during placement of the measuring brace 8. When the measuring brace 8 is worn by the test person, then the traversal element 9 of the measuring brace 8 extends at least approximately horizontally, that is, substantially in the x-axis and the z-axis should at least be substantially coincident with the optical axis of the video centering system (not shown). The y-axis defines the vertical direction.

The measuring brace 8 should be made as light as possible and, for this purpose, various plastics can be used. The tension bands (20, 20') are preferably made of polyester material having a high tensile strength. The measuring brace 8 can be cleaned with conventionally available cleaning agents as well as with alcohols.

Locating marks (21, 21') are applied to the legs (10, 10') below the joints (13, 13') and are here in the form of black circles. Rotational joints (13, 13'), frame receptacles (12, 12') on the legs (10, 10') and locating marks (21, 21') of the left side of the measuring brace 8 as well as of the right side of the measuring brace are each arranged at fixed distances with respect to each other. These locating marks (21, 21') serve for computing the system points of the measuring brace on a spectacle frame which is especially without a rim and for the case that an automatic frame rim detection fails. Rotatable joints (13, 13'), lower spectacle receptacles (11, 11') and locating marks (21, 21') of the left and right sides are each arranged at fixed distances to each other.

The measuring brace 8 includes marks (22, 22') to provide a dimensional standard. These marks can, for example, be two or more marks (22, 22') which are arranged at fixed distances to each other or a marking rod of defined length. The marks (22, 22') can have a double function and can also be applied for the determination of centering data. The determination of centering data is explained hereinafter. The marks (22, 22') should be at a distance of 5 cm to 20 cm, preferably 15 cm to 20 cm, or a marking rod (not shown) should have this length. The marks 22, 22' should preferably be applied to the traversal element 9. With the measurement standard or reference, fixed calibrating values are inputted for each video recording or photograph. In this way, one can work with different image enlargements without difficulty.

Target marks (23, 24, 25, 27, 27', 28, 28', 29, 29') are arranged on the measuring brace 8 for determining centering data.

Three front target marks (23, 24, 25) are arranged on the forward side of the traversal element 9 for determining the forward inclination angle ($\alpha$). The center front target mark 24 is arranged on a cone-shaped projection 26 at the center of the traversal element 9. The two additional front target marks (23, 25) are arranged equidistantly to the center front target mark 24 on the left and right end regions of the forward side of the traversal element 9. These two outer front target marks (23, 25) need not be equidistant to the center front target mark 24, only a defined distance is required. The two outer front target marks (23, 25) function in the present embodiment also for the measurement standard or reference, that is, are also the marks (22, 22'). The center front target mark 24 is arranged on the front projection 26 and therefore projects somewhat into space, that is, in the z-direction, namely, in the direction of the camera (not shown). This can be seen especially in FIGS. 2b and 2d.

The angle (ζ) of the head inclination to the side is determined from the front image in that the angle between the outer front target marks and the space horizontal is measured.

The angle (φ) of the head rotation to the side can also be determined from the front image.

Figure 2A:
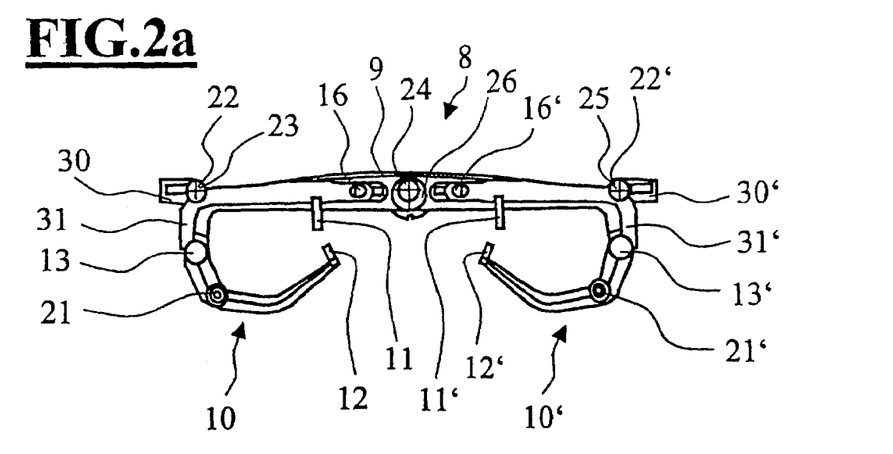
FIG. 2a is a front elevation view of the measuring brace of the invention without the spectacle frame.
Figure 2B:
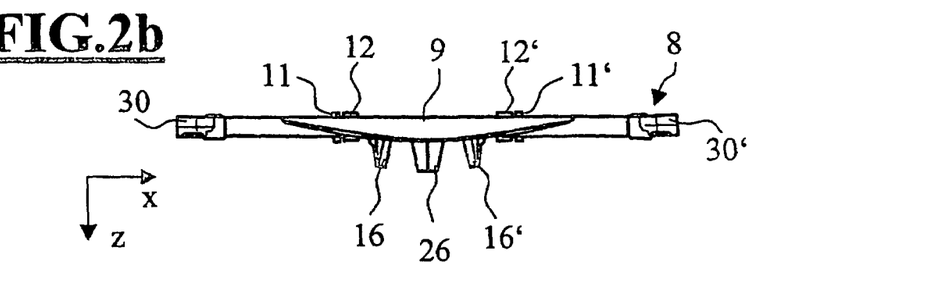
FIG. 2b is a schematic of the measuring brace of FIG. 2a seen in plan view.
Figure 2C:
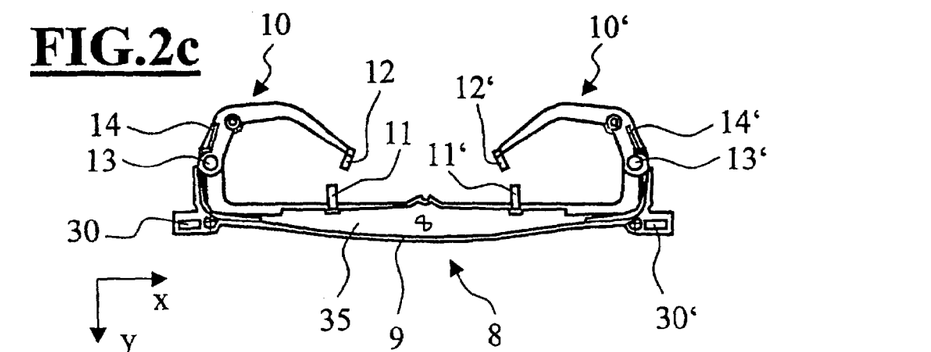
Figure 2D:
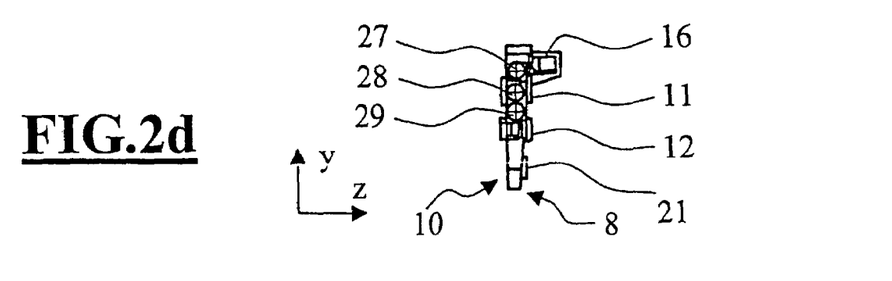

At least one side of the measuring brace 8 has side target marks for determining the corneal vertex distance. In the present case, three lateral target marks (27, 28, 29; 27', 28', 29') are provided for respective sides. However, more lateral as well as front target marks are also conceivable. The lateral target marks can be applied to both sides or to only one side. These lateral target marks are shown in FIGS. 2a and 2d. One of the lateral target marks per side is applied to one of the lateral projections (30, 30'), respectively. These are the lateral target marks 27 and 27'. The two additional lateral target marks (28, 29; 28', 29') are arranged directly at respective transition regions (31, 31') between traversal element 9 and legs (10, 10'). In this way, the two lateral target marks (28, 29; 28', 29') are arranged somewhat set back in the x-direction in space relative to the third lateral target marks (27, 27'), respectively.

To determine the corneal vertex distance or the distance of the corneal vertex to the frame plane, the test person can rotate in the direction of the image recording unit 38 or the lateral target marks (27, 27', 28, 28', 29, 29') are reflected toward the image recording unit 38 via a mirror arrangement (not shown). A second image recording unit 39 can be provided selectively.

The angle (φ) of the rotation of the head to the side is computed via the distance ratios between the center front target mark 24 and the two outer front target marks 23 and 25. The front image or the side image can be used for the determination of the angle (φ) of the rotation of the head to the side. In the determination utilizing the lateral image recording and the lateral target marks, the angle (φ) of the head rotation to the side can be considered in the determination of the corneal vertex distance. In the determination by means of the front image recording, the angle (φ) of the head rotation to the side can be used for determining the x-centering data and the y-centering data.

For all target marks, it is important that, in each case, at least three target marks have to be present in order to determine an angle. At least one of these target marks must be arranged offset by a defined amount relative to at least two other ones of these target marks in the direction of the optical axis of the image recorder. The target marks of a target mark group, that is, the target marks, which are applied to determine an angle, are preferably arranged in a horizontal row for the determination of the forward inclination angle and in a perpendicular row for the determination of the head inclination angle.

The target marks can be applied with adhesive or can be drawn. The projecting target marks (24, 27, 27') are arranged offset relative to the other target marks of their respective target mark groups; that is, the center front target mark 24 is arranged offset relative to the left front target mark 23 and the right front target mark 25; and, the upper lateral target mark 27 is arranged offset relative to the center lateral target mark 28 and the lower lateral target mark 29; and, the lateral target mark 27' is arranged offset relative to the center lateral target mark 28' and the lower lateral target mark 29'. The offset is, for example, 0.5 to 3 cm and the overhanging projections have a preferred length of 0.5 to 3 cm. Larger overhanging projections (26, 30, 30') are conceivable but can be difficult to manipulate. In a lateral recording, these upper lateral target marks (27, 27') are then arranged closer to the recording unit 39 or further away therefrom than the remaining lateral target marks (28, 28', 29, 29'). That is, for a lateral recording from the one side, the lateral target mark 27 is closer to the recording unit 39 than the lateral target marks 28 and 29. In a lateral recording with a recording unit arranged on the other side, the lateral target mark 27' is closer to the recording unit than the lateral target marks 28' and 29'.

Figure 3:
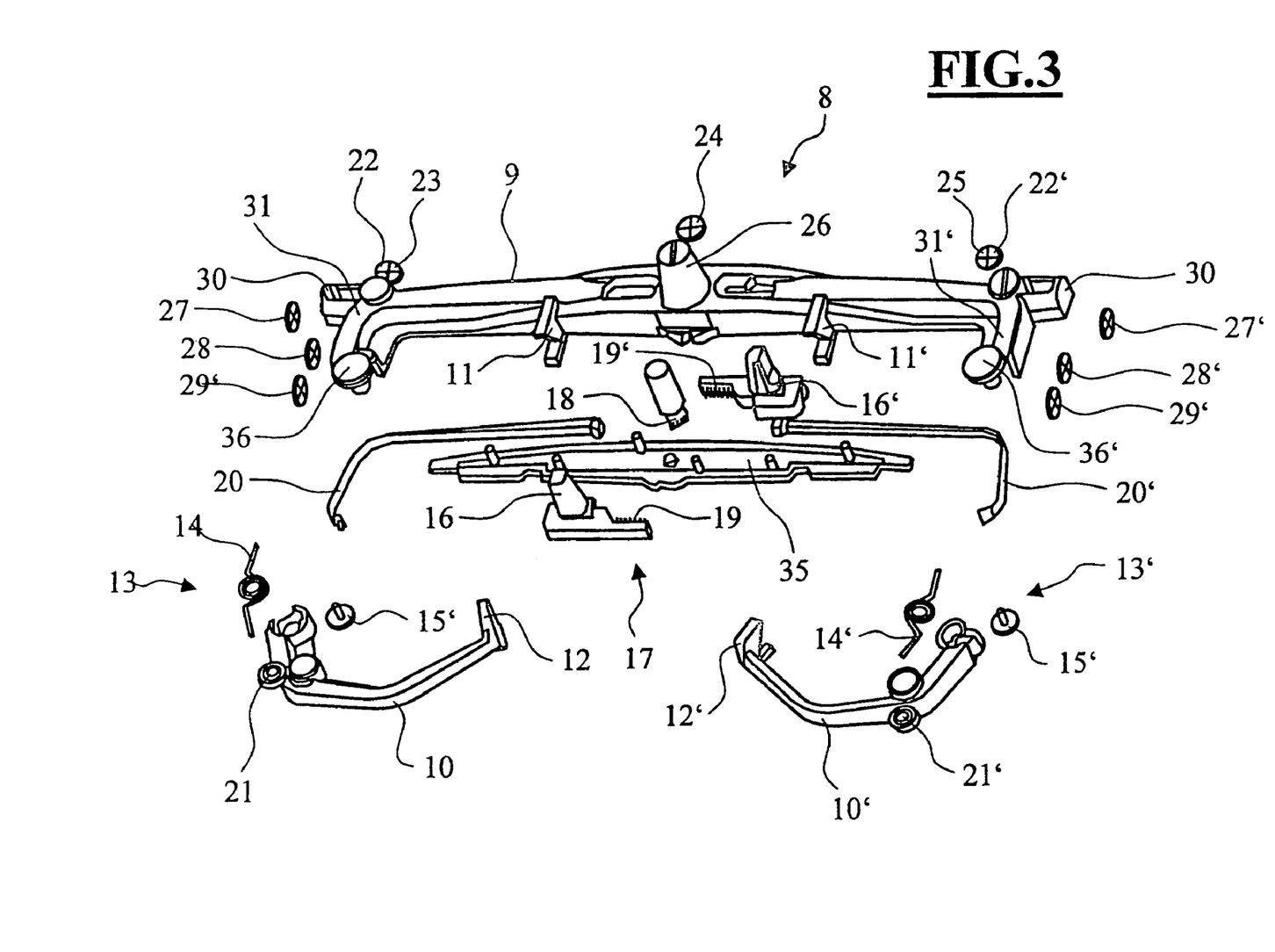
FIG. 3 is an exploded view of the measuring brace according to the invention.

FIG. 3 is an exploded view of the measuring brace of FIGS. 2a to 2d. Adjusting levers (16, 16') are connected together via toothed racks (19, 19') and a central toothed wheel 18. The central toothed wheel 18 projects partially into the front projection 26 configured in the form of a hollow cone. The adjusting levers (16, 16') are connected via two tension bands (20, 20') with legs (10, 10'). The joints (13, 13') have cover caps (36, 36') having joint pins, respectively.

FIG. 4 shows a measuring brace 8 having a spectacle frame 32 seated therein. The front target marks (23, 24, 25) are configured to be circular. Two mutually opposite lying circle quarters are shaded dark and two are bright. This provides a good contrast which facilitates a measurement. For a rimless spectacle frame (Bohrbrille, Nylorbrille) transparent support plano glasses can be used.

Additionally, further marks can be applied to the joint cover caps (36, 36') whereby the calibration of the particular measuring brace can take place via distance measurements at the start of the adjustment of the particular video centering system.

Figure 5:
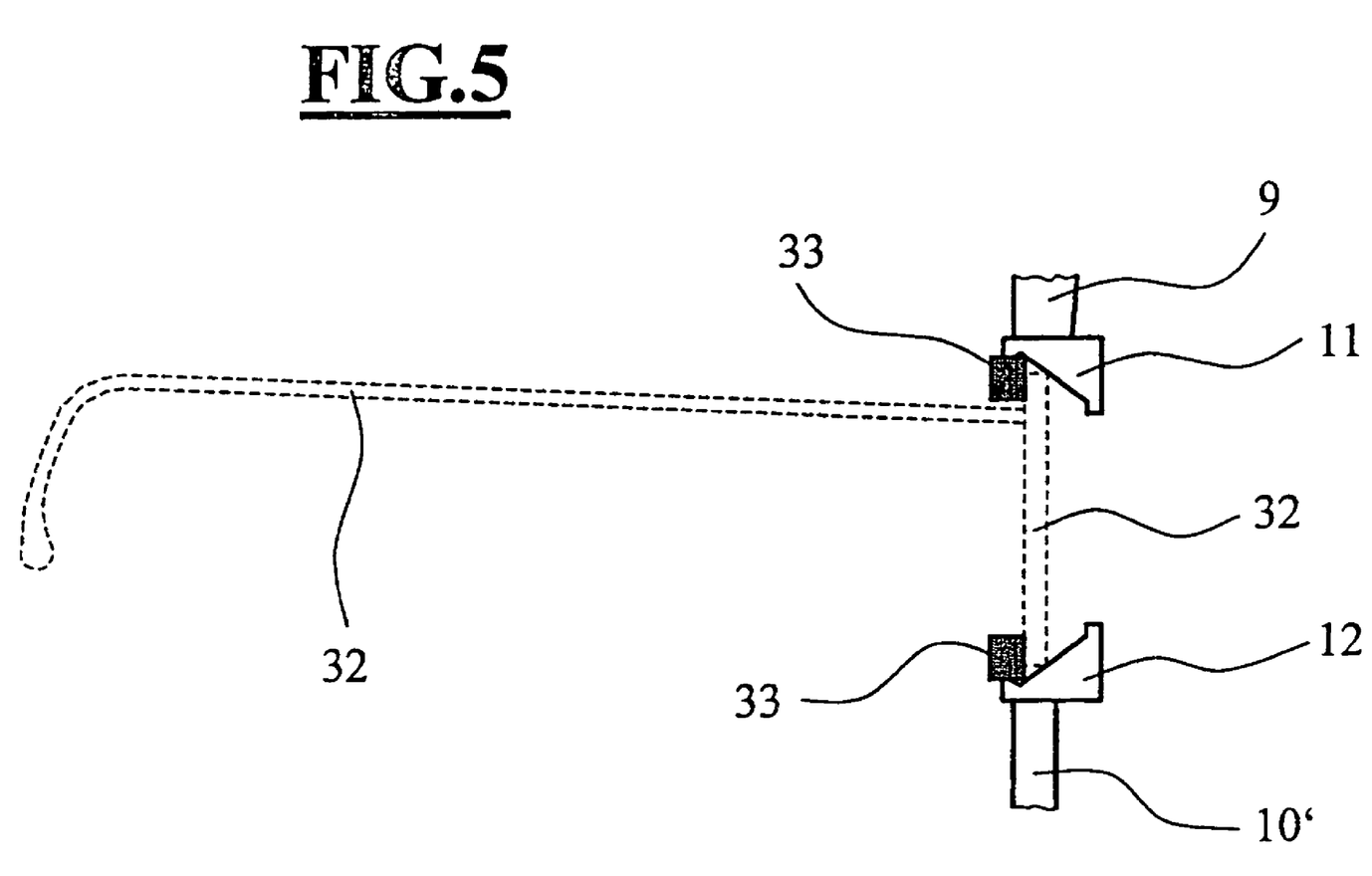
FIG. 5 is a detail view of an upper and a lower receptacle for the spectacle frame with the spectacle frame shown accommodated therein.

FIG. 5 shows a detail view of an upper and a lower spectacle frame receptacle (11, 12) with a spectacle frame 32 shown in phantom outline. The frame receptacles (11, 12) can, for example, have an approximately V-shape or a conical form and can have partially or completely a coating 33 of soft material, for example plastic, in order to protect the spectacle frame 32 and prevent scratches. The spectacle frames 32 of different thicknesses can be reliably accommodated because of the form of the frame receptacles.

Figure 6:
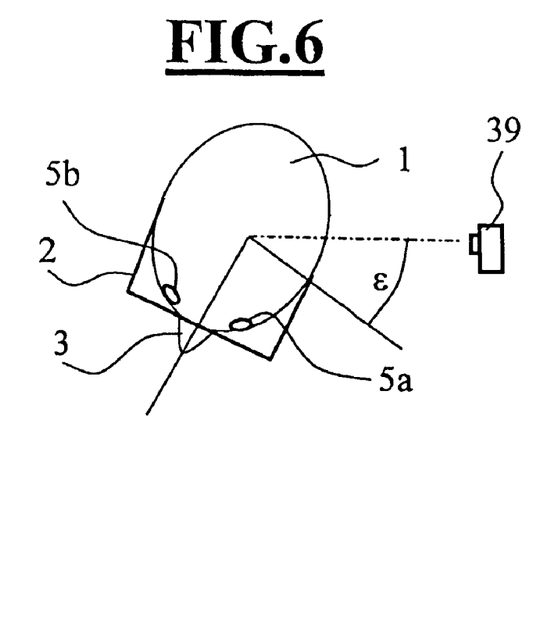
FIG. 6 shows the twist angle $\epsilon$ caused by a rotation of the head to the side during the measurement of centering data utilizing a lateral image.

FIG. 6 shows the twist angle (ε) for a lateral recording. The recording unit 39 is arranged in the extension of the dot-dash line. For a lateral image recording, the test person should be aligned precisely perpendicular to the camera, that is, the view of the test person through the spectacle frame 2 should be perpendicular to the optical axis of a recording unit, for example, a video camera or photo apparatus. The direction of view in FIG. 6 is indicated by the solid line through the nose of the test person. When the angle (ε) is equal to zero, this line runs perpendicular to the dot-dash line, that is, the frame plane of the spectacle frame 2 and the traversal element 9 of the measuring brace can be parallel or at least almost parallel to the dot-dash line when the angle (ε) is equal to zero. This is associated with much complexity and is unpleasant for the test person to be measured. This is so because the test person tends to assume a non-habitual posture when holding still. Already for a slight twist of the head 1 and therefore of the spectacle frame 2 of, for example, ε=1°, an error of approximately 1 mm arises in the measurement of the corneal vertex distance or the distance of the corneal vertex to the frame plane. This error must be compensated in order to arrive at a precise measurement. With the method described, very high measuring accuracy can be achieved. For a twist of a maximum ±10°, a corneal vertex distance or distance of the corneal vertex to the spectacle plane can be achieved with a deviation of <0.5 mm via compensation of the twist error. Without compensation, errors of ±10 mm away from the true value can be present. Since the deviation generally should not lie higher than ±1 mm, higher defective measurements should be rejected.

With the presence of three target marks, the position of the measuring brace with respect to the camera can be derived from the position of the three target marks.

The twist angle ($\phi$) (twist angle for front recording) and the twist angle ($\epsilon$) (twist angle for lateral recording) can be determined independently of each other and can be applied to the particular measurements, for example: x-centering data and y-centering data, corneal vertex distance and corneal vertex to frame plane.

Figure 7:
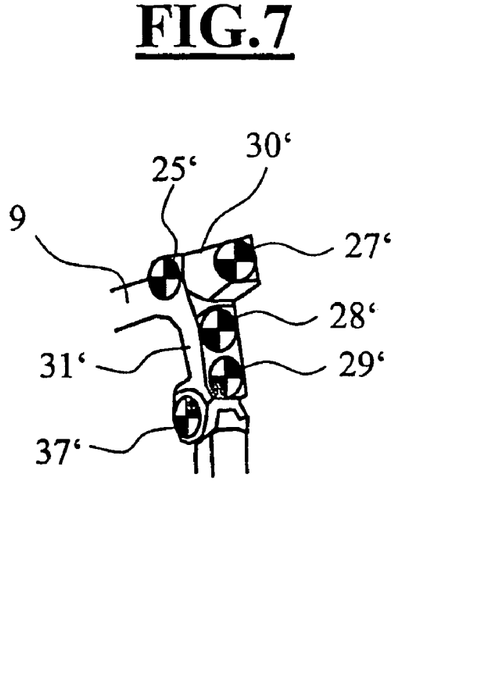
FIG. 7 is a cut-away view of the lateral marks of the measuring brace of the invention.
Figure 8A:
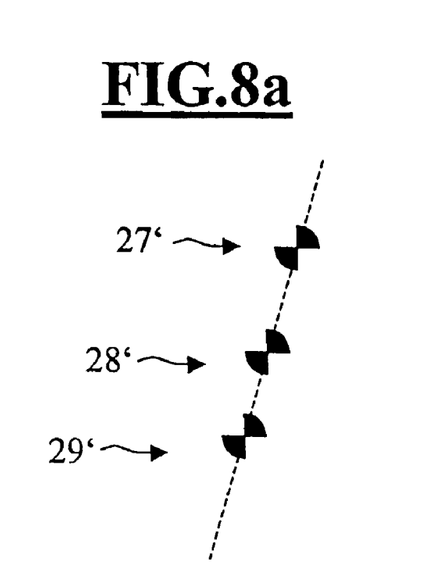
FIG. 8a is a schematic representation of the lateral marks without parallax; and, FIG. 8b is a schematic representation of the lateral marks with parallax.
Figure 8B:
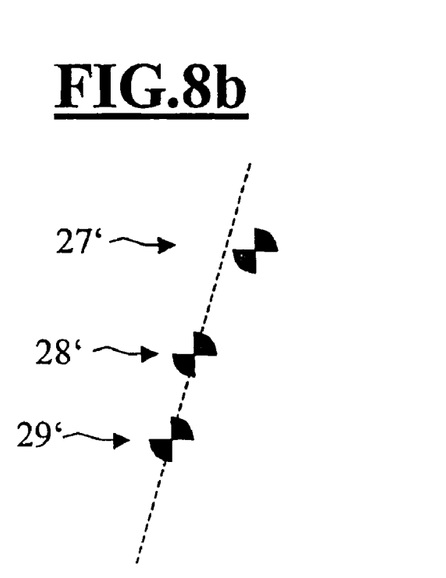

A detailed description now follows with respect to the lateral target marks (27, 27'; 28, 28'; 29, 29') according to the invention. A preferred embodiment of the lateral target marks (27, 27'; 28, 28'; 29, 29') is shown in FIGS. 7, 8a and 8b.

The lateral target marks (27, 27'; 28, 28'; 29, 29') are preferably applied to a lateral projection (30, 30') and a side region of the measuring brace (transition region 31, 31') (y-direction in FIG. 2d). The side region of the measuring brace preferably runs perpendicularly. It is necessary that one of the lateral target marks (27, 27') lies, in the direction of the recording unit 39, in another plane referred to the two other lateral target marks (28, 28', 29, 29'). Preferably, these lateral target marks (27, 27') are applied to a projecting nose (30, 30'). These lateral target marks (27, 27') can, however, also be arranged offset rearwardly relative to the two other lateral target marks (28, 28', 29, 29'). The twist angle ($\epsilon$) equals 0° for a perpendicular alignment of the test person including the spectacle frame 2 to the recording unit 39 and the three lateral target marks lie in a straight line. With a rotation of the head to the left or to the right, the twist angle ($\epsilon$) increases. Typical angles for habitual posture are up to ±10°. This twist is reflected in a deviation of the third target marks (27, 27') to the straight line drawn through the two other target marks (28, 28', 29, 29'). This deviation is shown in FIGS. 8a and 8b and is optically detected and evaluated. Based on the parallax, the twist angle ($\epsilon$) can be determined and can be used for the determination of the corneal vertex distance or a distance between corneal vertex and frame plane. The projecting third target mark (27, 27') must not be arranged in a straight line (in y-direction according to FIG. 2d) with the two other target marks (28, 28' and 29, 29'). The third target mark can also be laterally offset. However, the lateral target marks (27, 27') must be forward of or rearward of the straight line drawn through the two other lateral target marks (28, 28', 29, 29'). For a lateral target mark offset laterally caused by the arrangement, the offset for the measurement must be known in advance and considered in the computation of the twist angle ($\epsilon$). Furthermore, more than three lateral target marks and front target marks are conceivable.

Supplemental front target marks (37, 37') are shown in FIG. 4. These supplemental front target marks make possible the application of evaluation logarithms wherein no calibration is necessary. For example, five measuring marks are conceivable in the front view and/or five measuring marks in the lateral view. For the front view, usually only a few marks are used. The use of all five marks, however, permits an improved evaluation with important advantages, namely: a clearly more robust detection of the measuring brace is provided for critical images, for example, unsuitable image backgrounds with many mark-like objects; furthermore, an independent calibration of camera and measuring brace is possible; an improved measuring accuracy is also possible for clearly greater twist angles and forward inclination angles of the brace. In addition, a simulation of the complete test person measurement can be achieved and therefore, for example, a derivation of manufacturing tolerances of the measuring brace. One additional target mark is sufficient for use in the lateral view and lateral twist with this additional target mark defining a plane with the two lateral target marks (28, 28', 29, 29') or the front target marks 23 and 25. The third original target mark (27, 27') or 24 remains, however, on the overhanging projection or in a recess.

It is understood that the foregoing description is that of the preferred embodiments of the invention and that various changes and modifications may be made thereto without departing from the spirit and scope of the invention as defined in the appended claims.

What is claimed is:

1. A measuring brace for releasably attaching to a spectacle frame to be measured, the measuring brace having a forward side and comprising:
   a traverse;
   two legs connected to said traverse;
   at least three front target marks disposed on said forward side for measuring a forward inclination angle ($\alpha$) of said spectacle frame;
   at least one of said front target marks being spatially offset essentially perpendicular to said front side with respect to the remainder of said front target marks; and,
   at least three lateral target marks arranged on a lateral side of said measuring brace for measuring a twist angle ($\epsilon$).

2. The measuring brace of claim 1, wherein said measuring brace has a side region and said lateral target marks are disposed on said side region; and, at least one of said lateral target marks is laterally offset essentially perpendicular to said region with respect to the remainder of said lateral target marks.

3. The measuring brace of claim 2, wherein said side region has an overhanging lateral projection and said one lateral target mark is disposed on said projection.

4. The measuring brace of claim 2, wherein said side region has a recess and said one lateral target mark is disposed in said recess.

5. The measuring brace of claim 1, further comprising coupled clamping elements for fixing said spectacle frame.

6. A measuring brace for releasably attaching to a spectacle frame to be measured, the measuring brace having a forward side and comprising:
   a traverse;
   two legs connected to said traverse;
   at least three front target marks disposed on said forward side for measuring a forward inclination angle ($\alpha$) of said spectacle frame;
   at least one of said front target marks being spatially offset essentially perpendicular to said front side with respect to the remainder of said front target marks; and,
   coupled clamping elements for fixing said spectacle frame.

7. The measuring brace of claim 6, wherein said coupled clamping elements are synchronized.

8. The measuring brace of claim 6, wherein said front target marks are arranged along a straight line.

9. The measuring brace of claim 8, wherein said front target marks are arranged in the region of said traverse.

10. The measuring brace of claim 6, further comprising:
    said traverse having said forward side;
    an overhanging projection on said traverse;

said one front target mark being a middle front target mark disposed on said projection; and, the remaining ones of said front target marks being second and third front target marks disposed spaced from each other on said forward side of said traverse.

11. The measuring brace of claim 10, wherein said middle front target mark is forward of said second and third front target marks and the spacing between said middle front target mark and said second and third front target marks is between 5 and 50 mm.

12. The measuring brace of claim 11, wherein said spacing is between 10 and 20 mm.

13. The measuring brace of claim 6, further comprising two additional marks having a defined spacing to each other for a measurement standard or reference.

14. The measuring brace of claim 13, wherein said defined spacing is 10 to 20 cm.

15. The measuring brace of claim 6, wherein said measuring brace is configured to be manipulable with one hand.

16. The measuring brace of claim 6, further comprising at least one frame receptacle having an essentially conical receptacle surface.

17. A measuring brace for releasably attaching to a spectacle frame to be measured, the measuring brace having a forward side and comprising:
    a traverse;
    two legs connected to said traverse;
    at least three front target marks disposed on said forward side for measuring a forward inclination angle ($\alpha$) of said spectacle frame;
    at least one of said front target marks being spatially offset essentially perpendicular to said front side with respect to the remainder of said front target marks;
    coupled clamping elements for fixing said spectacle frame; and,
    a toothed gear assembly for coupling said clamping elements.

18. The measuring brace of claim 17, wherein said toothed gear assembly includes at least one toothed wheel and at least one toothed rack meshed with said toothed wheel.

19. The measuring brace of claim 18, wherein said toothed gear assembly includes a second toothed rack meshed with said toothed wheel.

20. The measuring brace of claim 17, wherein said clamping elements include at least one tension band and a spring.

21. The measuring brace of claim 20, wherein said clamping elements include a second tension band and a second spring.

22. An arrangement for determining the forward inclination angle ($\alpha$) of a spectacle frame, the arrangement comprising:
    a measuring brace for releasably attaching to a spectacle frame to be measured, the measuring brace having a forward side and including:
    a traverse;
    two legs connected to said traverse;
    at least three front target marks disposed on said forward side for measuring a forward inclination angle ($\alpha$) of said spectacle frame;
    at least one of said front target marks being spatially offset essentially perpendicular to said front side with respect to the remainder of said front target marks;
    at least three lateral target marks arranged on a lateral side of said measuring brace for measuring a twist angle ($\epsilon$); and,
    said arrangement further including:
    at least one optical recording unit facing toward said measuring brace; and,
    an evaluation unit connected to said optical recording unit.

23. The arrangement of claim 22, wherein said optical recording unit is a video camera or photo apparatus.

24. The arrangement of claim 22, wherein said evaluation unit is configured for determining the following: the angle of the head inclination to the side; the angle of head twist to the side; and, the corneal vertex distance.

25. The arrangement of claim 22, wherein said evaluation unit is configured to determine the centering points of said spectacle frame.

26. An arrangement for determining the forward inclination angle ($\alpha$) of a spectacle frame, the arrangement comprising:
    a measuring brace for releasably attaching to a spectacle frame to be measured, the measuring brace having a forward side and comprising:
    a traverse;
    two legs connected to said traverse;
    at least three front target marks disposed on said forward side for measuring a forward inclination angle ($\alpha$) of said spectacle frame;
    at least one of said front target marks being spatially offset essentially perpendicular to said front side with respect to the remainder of said front target marks; and,
    coupled clamping elements for fixing said spectacle frame; and,
    said arrangement further including:
    at least one optical recording unit facing toward said measuring brace; and,
    an evaluation unit connected to said optical recording unit.

27. The arrangement of claim 26, wherein said optical recording unit is a video camera or photo apparatus.

28. The arrangement of claim 26, wherein said evaluation unit is configured for determining the following: the angle of the head inclination to the side; the angle of head twist to the side; and, the corneal vertex distance.

29. The arrangement of claim 26, wherein said evaluation unit is configured to determine the centering points of said spectacle frame.

30. A method for determining the forward inclination angle ($\alpha$) of a spectacle frame worn by a test person, the method comprising the steps of:
    providing a measuring brace for releasably attaching to a spectacle frame to be measured, the measuring brace having a forward side and including: a traverse; two legs connected to said traverse; at least three front target marks disposed on said forward side for measuring a forward inclination angle ($\alpha$) of said spectacle frame; at least one of said front target marks being spatially offset essentially perpendicular to said front side with respect to the remainder of said front target marks; and, at least three lateral target marks for measuring a twist angle ($\epsilon$);
    placing said measuring brace on said spectacle frame worn by said test person with said person assuming the posture habitual for said person;
    making an image recording of at least part of the head of said test person from the front while wearing said spectacle frame and said measuring brace; and,
    mathematically determining said forward inclination angle ($\alpha$) based on said image recording.

31. The method of claim 30, wherein the following are determined: the angle of the inclination of the head to the side; the angle of twist of the head to the side and/or the corneal vertex distance.

32. The method of claim 30, wherein the center points of said spectacle frame are determined.

33. A method for determining the forward inclination angle (α) of a spectacle frame worn by a test person, the method comprising the steps of:
- providing a measuring brace for releasably attaching to a spectacle frame to be measured, the measuring brace having a forward side and including: a traverse; two legs connected to said traverse; at least three front target marks disposed on said forward side for measuring a forward inclination angle (α) of said spectacle frame; at least one of said front target marks being spatially offset essentially perpendicular to said front side with respect to the remainder of said front target marks; and, coupled clamping elements for fixing said spectacle frame;
- placing said measuring brace on said spectacle frame worn by said test person with said person assuming the posture habitual for said person;
- making an image recording of at least part of the head of said test person from the front while wearing said spectacle frame and said measuring brace; and,
- mathematically determining said forward inclination angle (α) based on said image recording.

34. The method of claim 33, wherein the following are determined: the angle of the inclination of the head to the side; the angle of twist of the head to the side and/or the corneal vertex distance.

35. The method of claim 33, wherein the center points of said spectacle frame are determined.

36. A method for determining the twist angle (ε), the method comprising the steps of:
- providing a measuring brace for releasably attaching to a spectacle frame to be measured, the measuring brace having a forward side and including: a traverse; two legs connected to said traverse; at least three front target marks disposed on said forward side for measuring a forward inclination angle (α) of said spectacle frame; at least one of said front target marks being spatially offset essentially perpendicular to said front side with respect to the remainder of said front target marks; and, at least three lateral target marks arranged on a lateral side of said measuring brace for measuring a twist angle (ε);
- placing said measuring brace on a spectacle frame;
- making an image recording from the side with said spectacle frame and said measuring brace; and,
- mathematically determining said twist angle (ε) based on said image recording.

37. The method of claim 36, wherein said measuring brace is placed on a spectacle frame worn by a test person assuming the posture habitual for said test person; and, said image recording is made of at least part of the head of said test person.

38. The method of claim 37, comprising the further step of determining the distance from the corneal vertex of said test person to the plane of said spectacle frame while considering said twist angle.

39. The method of claim 37, comprising the further step of determining the corneal vertex distance of said test person while considering said twist angle (ε).

40. A measuring brace for releasably attaching to a spectacle frame to be measured, the measuring brace having a forward side and comprising:
- a traverse;
- two legs connected to said traverse;
- at least three front target marks disposed on said forward side for measuring a forward inclination angle (α) of said spectacle frame;
- at least one of said front target marks being spatially offset essentially perpendicular to said front side with respect to the remainder of said front target marks;
- at least three lateral target marks for measuring a twist angle (ε); and,
- said side region having an overhanging lateral projection and said one lateral target mark being disposed on said projection.

* * * * *